United States Patent [19] [11] 4,284,534
Ehrlich [45] Aug. 18, 1981

[54] AQUEOUS BUBBLE BLOWING COMPOSITION

[75] Inventor: Joseph R. Ehrlich, New York, N.Y.
[73] Assignee: Jack S. Wachtel, Larchmont, N.Y.; a part interest

[21] Appl. No.: 200,424
[22] Filed: Oct. 24, 1980

Related U.S. Application Data

[63] Continuation-in-part of Ser. No. 26,527, Apr. 3, 1979, abandoned.

[51] Int. Cl.$^3$ .......... C11D 1/20; B01J 13/00
[52] U.S. Cl. .......... 252/542; 252/307; 252/545; 252/548; 252/550; 252/DIG. 14
[58] Field of Search .......... 252/3, 153, 542, 545, 252/548, 550, 307, DIG. 14; 46/6, 7

[56] References Cited

U.S. PATENT DOCUMENTS

| | | | |
|---|---|---|---|
| 2,433,625 | 12/1947 | Raspert | 252/307 |
| 2,469,045 | 5/1949 | La Vietes | 252/307 |
| 2,959,887 | 11/1960 | Remeika | 46/6 |
| 3,328,307 | 6/1967 | Schmitz | 252/106 |
| 3,561,154 | 2/1971 | Skinner | 46/6 |
| 3,630,951 | 12/1971 | Netherly | 252/307 |
| 3,862,823 | 1/1975 | Green et al. | 8/137 |

FOREIGN PATENT DOCUMENTS 51-11805 1/1976 Japan .
51-21588 2/1976 Japan .

OTHER PUBLICATIONS

C.A. 45160g: vol. 83, 1975, p. 100.

*Primary Examiner*—P. E. Willis, Jr.
*Attorney, Agent, or Firm*—Jacobs & Jacobs

[57] ABSTRACT

A non-toxic, non-eye-irritating bubble composition, consisting essentially of an aqueous solution of from about 1.5 to about 6% by weight of lauric diethanolamide, from about 0.75 to about 3% by weight of an alkanolamido half ester of a sulfosuccinic acid salt as surfactant, from about 0.05 to about 6% of a water-soluble film-forming agent selected from the group consisting of polyvinylpyrrolidone, polyethylenoxide, polyvinylalcohol, cellulose and gelatin, the weight ratio of said lauric diethanolamide to said surfactant on a dry basis being from about 1.74:1 to about 2.4:1, from 0 to about 10% by weight of glycerin, and the balance water.

11 Claims, No Drawings

AQUEOUS BUBBLE BLOWING COMPOSITION

The present application is a continuation-in-part of my copending application, Ser. No. 026,527 filed Apr. 3, 1979, now abandoned, which discloses bubble compositions. The copending application of Jack Wachtel, Ser. No. 026,528 filed Apr. 3, 1979 discloses apparatus for blowing bubbles. Both of these applications are incorporated herein by reference thereto.

The present invention relates to aqueous bubble compositions and to a method for making bubbles therefrom.

The present invention provides an improved bubble composition for making "snow storm bubbles." These bubbles, with only a single blast of air, flow out of the blowing tube in a sustained stream of bubbles, looking almost like a flowing liquid. Over one-hundred bubbles per puff or blast of air can be produced, a phenomenon quite unlike anything in the prior art. The present invention provides for bubble solutions of unusually great capacity. From any given volume of the liquid one can produce many times more bubbles than from an equal volume of commercial bubble solution. This is accomplished without using ingredients that are toxic when ingested or are irritating to the eye or skin.

In particular, the present invention provides a non-toxic, non-eye irritating bubble composition, consisting essentially of an aqueous solution of from about 2.0 to about 6% by weight of lauric diethanolamide, from about 1.0 to about 3% by weight of an alkanolamido half ester of a sulfosuccinic acid salt as surfactant, from about 0.05 to about 6% of a water-soluble film-forming agent selected from the group consisting of polyvinylpyrrolidone, polyethyleneoxide,polyvinylalcohol, cellulose derivatives and gelatin, the weight ratio of said lauric diethanolamide to said surfactant on a dry basis being from about 1.7:1 to about 2.4:1, from about 0 to about 10% by weight of glycerin, and the balance water.

The lauric diethanolamide used in the invention is commercially available. Thus, Witco Chemical Corp., Organics Div., 277 Park Ave., New York, N.Y. 10017, sells this product under the tradename Witcamid 5195. A 10% water solution of this product will start crystallizing after about 10 hours. Crystallization starts at the top of the liquid, with long, needle-like crystals growing down to the bottom. At that point, the entire mass appears to be solid with no loss in weight. With a 7% solution, crystallization takes several days; with a 5.5% solution crystallization takes 6–8 weeks; with a 4.9% solution, 14–15 weeks. Other commercially available lauric diethanolamides include Schercomid SL-EX and Clindrol 100L.

The lauric diethanolamide is used in an amount of from about 2.0 to about 6%, preferably from about 2 to about 5%, by weight, based on the weight of the composition.

The surfactant employed in the bubble compositions of the present invention cooperates with the lauric diethanolamide to provide film-forming properties as well as proper viscosity. The alkanolamido half esters of sulfosuccinic acid salts used as surfactant in the invention are commercially available and are formed by reacting maleic anhydride with the amide of a higher fatty acid with a lower alkanolamine, followed by reacting the product with sodium bisulfate. In some cases, the alkanolamine is ethoxylated. The general formula for these surfactants is

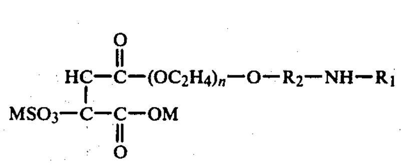

wherein $R_1$ is alkanoyl or alkenoyl, e.g. $R_1$ is alkanoyl or alkanoyl of 10 to 20 carbon atoms;

$R_2$ is lower alkylene, i.e. of 1 to 6 carbon atoms e.g. ethylene or isopropylene;

n is 0 to 5 or higher; and

M is a monovalent metal, such as an alkali metal.

In the present invention, preferred surfactants are those formed from the amide obtained by reacting lauric acid with monoethanolamine (MEA) ethoxylated with three ethoxy groups or from the amide formed by reacting oleic acid with monoisopropanolamine (MIPA).

The surfactant is present on a dry basis in an amount of from about 1.0 to about 3%, preferably from about 1 to about 2.5% by weight of the composition. It is essential that the ratio of amide to surfactant, on a dry basis be from about 1.7:1 to about 2.4:1, preferably from about 1.9:1 to about 2.1:1, and most preferably 2.0:1.

The third essential component of the invention is polyoxyethylene, polyvinylpyrrolidone, polyvinylalcohol, gelatin or a cellulose, such as methyl cellulose, hydroxypropyl cellulose, etc., which are all water-soluble film-forming agents. These materials are employed in an amount of from about 0.05 to about 6%, preferably from about 0.10 to about 5%, by weight, based on the weight of the composition.

Surprisingly, the results of the present invention are obtained only when all of the following are observed:

1. The acid moiety of the alkanolamide must be lauric acid;
2. the alkanolamine moiety of the alkanolamide must be diethanolamine;
3. the ratio of alkanolamide to surfactant must be from about 1.74:1 to about 2.4:1, preferably essentially 2:1, and
4. the specified film-former must be used in an amount of from about 0.05 to about 6%.

When the ingredients and proportions specified above are employed, the resulting bubble solution is capable of forming vast numbers of bubbles per puff of air, a feat unheard of in the prior art. In any case, the bubbles are made by forming a layer of the bubble composition on a surface by placing a small amount, e.g. a few drops, of the composition on the surface, touching the layer with the tip of a narrow tube, withdrawing the tip with a thin liquid film of the bubble composition across the opening at said tip, and holding the tube against the lips of the user with said tip pointed upwardly and with the tube at an acute angle with respect to the vertical, and then expelling the air gently through the tube to form bubbles from the thin liquid film across the tip. This procedure is described in detail in my copending application, Ser. No. 026,527, mentioned above. While a simple straw can be used to produce these bubbles, the bubble pipe of the above-mentioned Wachtell application, Ser. No. 026,528 is preferred. Pipes having multiple tubes other than the Wachtel bubble pipe can also be used.

When polyoxethylene is used as the film-forming agent, the bubbles can break with a crackling noise. Depending on the amount of polyoxyethylene, the bubbles may also form flakes, which gently fall to the ground like snow. In general, the higher the molecular weight of the polyoxyethylene, the smaller the amount that is used. Thus, Polyox WSR-N-10 (MW 100,000) is generally used at 4% or more, while Polyox WSR-N-750 (MW 300,000) can be used at about 2% and Polyox WSR-N-3000 (MW 400,000) can be used at 0.1%. Polyox WSR-205 (MW 600,000) does not precisely fit this rule, as amounts as high as 2% may have to be used. (compare Examples 8 and 12 hereinafter).

High molecular weight polyvinylpyrrolidone also gives crackling and flaking, but only at high concentrations.

Other additives can be used, but are not essential. For example, sodium lauryl sulfate increases the viscosity of the solution, and most of all helps keep the bubble solutions clear and uniform. Depending on the type of film-forming material, some solutions have a tendency to become hazy or even turbid or to separate into clear layers. Sodium lauryl sulfate often acts as a hydrotrope in such cases, and can be used in an amount of 0.3 to 1.5%; higher percentages might have an adverse affect on viscosity.

Another useful additive is sodium chloride in small quantities. Depending on the specific composition of the solution, a useful quantity is from 0.05% to 0.5%, usually 0.16–0.2%. The sodium chloride may cause a tremendous viscosity increase and must be used sparingly. In some cases, the addition of sodium chloride increases the viscosity, number of bubbles and their floating time very impressively.

The addition of glycerine, e.g. up to 10%, increases the floating time of the bubbles. The use of glycerin almost invariably eliminates the effect of crackling and flaking. In certain formulations, the addition of bacteriocides can be helpful.

The following Examples illustrate preferred embodiments of the invention. In these Examples, trade names are used to identify the ingredients to aid the public in reproducing the Examples. The operation of the invention does not depend on the use of the specific trade-named material; the same chemicals made by other companies can be used. For example, Standopol SH-100 and SH-135 are the trade names of Henkel, Inc. for a 30% and 35% aqueous solution, respectively, of disodium monoleamido PEG-2 sulfosuccinate, a surfactant of the formula set forth above. Monomate OPA-100 manufactured by Mona Industries, Inc., Patterson, N.J. and EMCOL 41612 manufactured by Witco Chemical Corp., Houston, Tex., are also suitable surfactants.

The following is a key to the materials used in the Examples.

| TRADENAME | CHEMICAL IDENTITY |
|---|---|
| Schercomid SL-EX<br>Witcamid 5195<br>Clindrol 100L | lauric diethanolamide |
| Schercopol LMPS | 39% aqueous solution of disodium monolauramido MEA sulfosuccinate |
| Schercopol OMS-Na 35 | 35% aqueous solution of disodium monooleamido MEA sulfosuccinate |
| Schercopol OMIS-Na 40 | 40% aqueous solution of disodium monooleamido MIPA sulfosuccinate |

-continued

| TRADENAME | CHEMICAL IDENTITY |
|---|---|
| Polyox WSR-N-10 | Polyethylene Oxide M.W. 100,000 |
| Polyox WSR-N-750 | Polyethylene Oxide M.W. 300,000 |
| Polyox WSR-N-3000 | Polyethylene Oxide M.W. 400,000 |
| Polyox WSR-205 | Polyethylene Oxide M.W. 600,000 |
| Elvanol 71-30 | Polyvinyl alcohol, 99% hydrolized, |
| PVP K-30 | Polyvinylpyrrolidone M.W. 40,000 |
| PVP K-90 | Polyvinylpyrrolidone M.W. 360,000 |
| Duponol C | USP grade Sodium Lauryl Sulfate |

In the following Examples and in this specification and appended claims, all parts, percentages and proportions are by weight, unless otherwise stated.

EXAMPLE 1

A bubble solution was formed from the following:

| Parts | |
|---|---|
| 3.50 | Diethanolamide (Witcamid 5195) |
| 4.50 | Alkanolamide half ester of sulfosuccinic acid sodium salt (Schercopol LMPS) |
| 0.75 | Sodium lauryl sulfate (Duponol C) |
| 0.16 | Sodium chloride |
| 4.00 | Polyoxethylene (polyox WSRN-10) |
| 87.09 | Water |

The diethanolamide, alkanolamido half ester of sulfosuccinic acid sodium salt and polyoxyethylene were mixed together under heating to no more than 50° C., after which the sodium chloride and part of the water was added, followed by addition of the remainder of the water and the sodium lauryl sulfate. Heating was continued until all of the ingredients were well dissolved, after which the solution was left to cool. The solids content was 10.16%.

Using simple straws of 4 to 6 mm in diameter, a large number of bubbles per puff of air are obtained from the resulting bubble solution. The bubbles sink down as flakes.

The solution can be diluted with water to a solids content of 7.5% while retaining its ability to form flaking bubbles.

The procedure of Example 1 was followed in the following Examples.

EXAMPLE 2

| Parts | |
|---|---|
| 2.80 | Schercomid SL-EX |
| 3.60 | Schercopol LMPS |
| 4.00 | Polyox N-10 |
| 89.60 | Water |

A bubble solution of 8.2% solids was obtained. This solution gave 40–70 multiple bubbles that crackle lightly on bursting and come down slowly as thin flakes. The addition of 0.5 parts sodium lauryl sulfate makes the solution translucent/transparent, less stringy and gives 70–80 individual bubbles with mild crackling and thin flakes. Further addition of 3.5 parts of glycerin makes the bubbles float for several minutes with no crackling noise, but still a few flakes.

EXAMPLE 3

| Parts | |
|---|---|
| 4.40 | Witcamid 5195 |
| 5.50 | Schercopol LMPS |
| 4.00 | Glycerin |
| 2.76 | PVP K-90 |
| 1.10 | Duponol C |
| 82.24 | Water |

The solution was clear and contained 10.39% solids and gave 80-90 long-floating bubbles.

EXAMPLE 4

| Parts | |
|---|---|
| 3.50 | Witcamid 5195 |
| 4.50 | Schercopol LMPS |
| .16 | Sodium chloride |
| 4.59 | Polyox WSR N-10 |
| 87.25 | Water |

The solution contained 10.0% solids and produced 80-90 bubbles with some crackling and flakes.

EXAMPLE 5

| Parts | |
|---|---|
| 3.50 | Witcamid 5195 |
| 4.50 | Schercopol LMPS |
| .16 | Sodium chloride |
| 1.50 | Polyox WSR N-10 |
| 90.34 | Water |

The solution contained 6.91% solids and gave 80-90 bubbles with loud crackles.

EXAMPLE 6

| Parts | |
|---|---|
| 3.52 | Witcamid 5195 |
| 4.52 | Schercopol LMPS |
| .15 | Sodium Chloride |
| .46 | Gelatin (300 Bloomgram) |
| .75 | Duponol C |
| 90.10 | Water |
| .50 | Bacteriocide |

The solution contained 6.64% solids and formed 80 quickly bursting bubbles. When 2.5 parts glycerin was added, floating bubbles were obtained.

EXAMPLE 7

| Parts | |
|---|---|
| 3.50 | Witcamid 5195 |
| 4.50 | Schercopol LMPS |
| .16 | Sodium chloride |
| 1.00 | Polyox WSR N-10 |
| 90.84 | Water |

The solution contained 6.41% solids and formed 80-100 crackling bubbles with no flakes.

EXAMPLE 8

| Parts | |
|---|---|
| 3.50 | Witcamid 5195 |
| 4.50 | Schercopol LMPS |
| 0.25 | Polyox WSR 205 |
| 91.75 | Water |

The solution contained 4.3% solids and formed up to 50 slightly crackling, weakly flaking, heavy bubbles. Many multiple bubbles were formed. Using 2 parts Polyox WSR 205 in place of 0.25 parts gave no different result.

EXAMPLE 9

| Parts | |
|---|---|
| 3.50 | Schercomid SL-EX |
| 4.50 | Schercopol LMPS |
| .76 | Duponol C |
| .13 | Sodium Chloride |
| 2.00 | Elvanol 71-30 |
| 89.11 | Water |

The solution contained 8.14% solids and formed 70-80 fast disappearing bubbles with no crackling and no flakes. The solution separates on standing and requires shaking before use.

EXAMPLE 10

Example 9 is repeated but the Elvanol is replaced by Polyox WSR-N-3000. This yields a clear, uniform, viscous solution which provides 70-80 crackling bubbles.

EXAMPLE 11

| Parts | |
|---|---|
| 4.4 | Schercomid SL-EX |
| 5.5 | Schercopol LMPS |
| .8 | Duponol C |
| .2 | Sodium Chloride |
| .1 | Polyox WSR-N-3000 |
| 89.0 | Water |

The clear viscous solution contained 7.64% solids and formed 70 bubbles with thin flakes and crackling. This solution was diluted to 6.79% solids and still formed 60-70 crackling bubbles and thin flakes.

EXAMPLE 12

| Parts | |
|---|---|
| 3.50 | Schercomid SL-EX |
| 4.50 | Schercopol LMPS |
| .75 | Duponol C |
| .16 | Sodium Chloride |
| 2.27 | Polyox WSR-N-750 |
| 88.82 | Water |

The hazy viscous solution had 8.43% solids and gave 100 and more slightly crackling bubbles and thin flakes, including multiples and clusters. When 3.2 parts glycerin were added, 100-120 long floating bubbles were obtained.

EXAMPLE 13

| Parts | |
|---|---|
| 3.50 | Schercomid SL-EX |
| 4.50 | Schercopol LMPS |
| .75 | Duponol C |
| .16 | Sodium Chloride |
| .45 | Polyox WSR-N-3000 |
| 90.64 | Water |

The solution had a solids content of 6.61% and was very slightly hazy and had very low viscosity. 80 bubbles with some flakes, some multiples, were formed.

EXAMPLE 14

| Parts | |
|---|---|
| 3.50 | Schercomid SL-EX |
| 4.40 | Schercopol LMPS |
| .75 | Duponol C |
| .15 | Sodium Chloride |
| 2.27 | Polyox WRS-N-3000 |
| 88.93 | Water |

This solution had 8.42% solids and formed up to 90 crackling, flaking bubbles. The solution can be diluted 20% to 7.02 solids with good results.

EXAMPLE 15

| Parts | |
|---|---|
| 2.60 | Witcamid 5159 |
| 3.30 | Schercomid LMPS |
| .40 | Duponol C |
| .16 | Sodium Chloride |
| 91.62 | Water |
| 1.92 | Polyox WSR-N-3000 |

The solution contained 6.32% solids and formed 70 bubbles, with multiples, clusters thick flakes, and some crackling.

EXAMPLE 16

| Parts | |
|---|---|
| 2.40 | Witcamid 5195 |
| 3.00 | Schercopol LMPS |
| 1.90 | Polyox WSR-N-3000 |
| 2.70 | Glycerin |
| 90.00 | Water |

The solution contained 5.47% solids and was hazy and viscous. It formed 50–70 bubbles with no flakes and no crackling.

EXAMPLE 17

| Parts | |
|---|---|
| 3.50 | Schercomid SL-EX |
| 4.50 | Schercopol LMPS |
| .75 | Duponol C |
| .15 | Sodium Chloride |
| 4.55 | Polyox WSR-N-750 |
| 86.55 | Water |

This solution contained 10.70% solids and was turbid and very viscous. It formed 50–60 bubbles with heavy flakes. When diluted with water to 8.57% solids, 60 flaking bubbles were formed. When diluted with water to 6.27% solids, 40–50 bubbles were formed (no flakes).

EXAMPLE 18

| Parts | |
|---|---|
| 3.50 | Schercomid SL-EX |
| 4.50 | Schercopol LMPS |
| .75 | Duponol C |
| .15 | Sodium Chloride |
| 1.82 | Polyox WSR-N-3000 |
| 89.28 | Water |

A hazy viscous solution of 7.46% solids was obtained from which 60–80 crackling, flaking, pulverizing bubbles were formed. The solution can be diluted 20–25% with water with good results.

EXAMPLE 19

| Parts | |
|---|---|
| 2.96 | Schercomid SL-EX |
| 3.80 | Schercopol LMPS |
| .60 | Duponol C |
| 1.30 | Polyox WSR-N-3000 |
| .10 | Sodium Chloride |
| 91.24 | Water |

A slightly hazy solution of 6.44% solids was obtained from which 60–90 crackling bubbles were formed, with multiples, bubbles breaking in a cloud of dust, droplets and flakes.

EXAMPLE 20

| Parts | |
|---|---|
| 1.95 | Witcamid 5195 |
| 1.95 | Schercomid SL-EX |
| 4.82 | Schercopol LMPS |
| .65 | PVP K-90 |
| .90 | Duponol C |
| .27 | Sodium Chloride |
| 89.46 | Water |

A clear solution of 7.60% solids was obtained, from which 80 bubbles were formed.

EXAMPLE 21

| Parts | |
|---|---|
| 3.50 | Schercomid SL-EX |
| 4.40 | Schercopol LMPS |
| .125 | PVP K-30 |
| .125 | PVP K-90 |
| 1.10 | Duponol C |
| 90.75 | Water |

A solution was obtained with 6.81% solids and very low viscosity. 50–60 sinking bubbles were formed. The addition of 0.24 parts sodium chloride increased the viscosity and 60–80 bubbles were formed.

EXAMPLE 22

| Parts | |
|---|---|
| 2.6 | Witcamid 5195 |
| 3.3 | Schercopol LMPS |
| .4 | Duponol C |

-continued

| Parts | |
|---|---|
| 1.0 | Sodium lauryl ether sulfate, 30% aqueous solution |
| 1.6 | PVP K-90 |
| .1 | Gelatin 300 bloomgram |
| 2.9 | Glycerin 95% |
| .5 | Bacteriocide |
| 87.7 | Water |

A thin clear solution of 6.78% solids was obtained, which gave 60–70 floating bubbles per puff.

EXAMPLE 23

| Parts | |
|---|---|
| 4.4 | Schercomid SL-EX |
| 5.5 | Schercopol LMPS |
| 0.8 | Duponol C |
| 0.2 | Sodium Chloride |
| 0.1 | Polyox WSR-N-3000 |
| 0.6 | Polyox WSR-N 10 |
| 88.4 | Water |

A slightly hazy, viscous solution was obtained which contained 7.94% solids and which gave 100 crackling (but not flaking) vanishing bubbles. When 3 parts of glycerin are added, the result is 120 vanishing bubbles that float for a long time. This is a snowstorm that can be used indoors. The bubbles are completely dry to the touch.

EXAMPLE 24

| Parts | |
|---|---|
| 4.4 | Witcamid 5195 |
| 5.5 | Schercopol LMPS |
| .6 | Duponol C |
| .16 | Sodium Chloride |
| 1.00 | Polyox WSR-N-3000 |
| .50 | Bio Terge AS-90 F |
| 87.84 | Water |

A slightly hazy viscous solution of 8.30% solids was obtained which formed 80–100 floating bubbles with slight crackling and thin flakes. These bubbles float though they do not contain glycerin and still crackle and flake. Bio Terge AS-90F is sodium alpha olefin sulfonate made by Stepan Chemical Co., Northfield, Ill.

EXAMPLE 25

| Parts | |
|---|---|
| 3.60 | Schercomid SL-EX |
| 5.10 | Schercopol OMIS-Na 35 |
| .60 | Duponol C |
| .10 | Sodium Chloride |
| .50 | Polyox WSR-N-3000 |
| 2.10 | Glycerin |
| 88.00 | Water |

A viscous, slightly hazy solution of 5.98% solids was formed which gave 70–80 floating bubbles.

EXAMPLE 26

| Parts | |
|---|---|
| 3.80 | Schercomid SL-EX |
| 4.90 | Schercopol LMPS |
| 0.60 | Duponol C |
| 0.20 | Sodium Chloride |
| 0.40 | Polyox WSR-N-3000 |
| 0.40 | Hydroxypropyl Cellulose |
| 89.80 | Water |

A clear viscous solution of 7.3% solids was formed, which gave 80–100 vanishing bubbles.

The solutions of Examples 1–26 are non-toxic. They are non-irritating to the eye, as determined by the Draize eye-irritation test. The compositions are no more than minimal irritants as determined by the Primary Dermal Irritants test.

What is claimed:

1. A non-toxic, non-eye-irritating bubble composition, consisting essentially of an aqueous solution of from about 2.0 to about 6% by weight of lauric diethanolamide, from about 1.0 to about 3% by weight of an alkanolamido half ester of a sulfosuccinic acid salt as surfactant, from about 0.05 to about 6% of a water-soluble film-forming agent selected from the group consisting of polyvinylpyrrolidone, polyethylenoxide, polyvinylalcohol, a cellulose and gelatin, the weight ratio of said lauric diethanolamide to said surfactant on a dry basis being from about 1.7:1 to about 2.4:1, from 0 to about 10% by weight of glycerin, and the balance water.

2. The composition according to claim 1, wherein said surfactant is of the formula

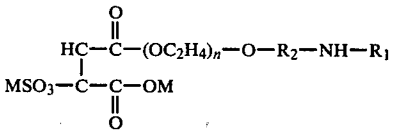

wherein $R_1$ is alkanoyl or alkenoyl, $R_2$ is lower alkylene, n is 0 to 5, and M is a monovalent metal.

3. The composition according to claim 2, wherein $R_1$ is alkanoyl or alkenoyl of 10 to 20 carbon atoms.

4. The composition according to claim 2, wherein $R_1$ is lauroyl, $R_2$ is ethylene, n is 3 and M is sodium.

5. The composition according to claim 2, wherein $R_1$ is oleoyl, $R_2$ is isopropylene, n is zero and M is sodium.

6. The composition according to claim 1, wherein the lauric diethanolamide is present in an amount of from about 2 to about 5% by weight.

7. The composition according to claim 1, wherein the ratio of lauric diethanolamide to surfactant is from about 1.9:1 to about 2.1:1.

8. The composition according to claim 1, wherein the ratio of lauric diethanolamide to surfactant is essentially 2:1.

9. The composition according to claim 1, wherein the surfactant is present in an amount of from about 1 to about 2.5% by weight.

10. The composition according to claim 1, wherein the film-forming material is present in an amount of from about 0.10 to about 5% by weight.

11. The composition according to claim 1, further containing at least one of sodium lauryl sulfate in an amount of from about 0.3 to about 1.5% by weight, and sodium chloride in an amount of from about 0.05% to about 0.5% by weight and glycerine in an amount of up to about 10% by weight.

* * * * *